US010685247B2

(12) United States Patent
Bhatia et al.

(10) Patent No.: US 10,685,247 B2
(45) Date of Patent: Jun. 16, 2020

(54) INFRASTRUCTURE-DEVICE STATUS-VERIFICATION SYSTEM FOR AUTOMATED VEHICLES

(71) Applicant: Aptiv Technologies Limited, St. Michael (BB)

(72) Inventors: Gaurav Bhatia, Pittsburgh, PA (US); Jong Ho Lee, Pittsburgh, PA (US); Junsung Kim, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 101 days.

(21) Appl. No.: 15/083,520

(22) Filed: Mar. 29, 2016

(65) Prior Publication Data
US 2017/0286784 A1   Oct. 5, 2017

(51) Int. Cl.
*G06K 9/00* (2006.01)
*H04B 1/38* (2015.01)
(Continued)

(52) U.S. Cl.
CPC ......... *G06K 9/00825* (2013.01); *G06F 11/00* (2013.01); *G08G 1/09675* (2013.01);
(Continued)

(58) Field of Classification Search
CPC ... G06K 9/00825; B60W 30/00; G08G 1/143; G08G 1/096783; G08G 1/096725;
(Continued)

(56) References Cited

U.S. PATENT DOCUMENTS 5,760,962 A      6/1998 Schofield et al.
5,822,127 A  * 10/1998 Chen ................. G02B 27/0172
                                                          359/631
(Continued)

FOREIGN PATENT DOCUMENTS

KR   10-2013-0085235 A   7/2013

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
(Continued)

*Primary Examiner* — Tung T Vo
(74) *Attorney, Agent, or Firm* — Fish & Richardson P.C.

(57) ABSTRACT

An infrastructure-device status-verification system suitable for use by an automated vehicle includes a transceiver, an object-detector, and a controller. The transceiver is suitable to install on a host-vehicle. The transceiver is used to receive an indicated-status of an infrastructure-device. The object-detector is suitable to install on the host-vehicle. The object-detector is used to determine a detected-status of the infrastructure-device. The controller is in communication with the transceiver and the object-detector. The controller determines a confirmed-status of the infrastructure-device based on the indicated-status and the detected-status. The system provides for increased confidence and security regarding information about the status of an infrastructure-device such as the traffic-signal (e.g. red, yellow, and green), thereby avoid miss-information caused by, for example, hacking or spoofing of V2I communications from the infrastructure-device, and overcome instances when the field-of-view between the object-detector and the infrastructure-device 26
(Continued)

becomes occluded after the confirmed-status has been established or determined.

20 Claims, 3 Drawing Sheets

(51) Int. Cl.
| | |
|---|---|
| *G08G 1/0967* | (2006.01) |
| *H04W 84/00* | (2009.01) |
| *H04L 29/08* | (2006.01) |
| *H04W 4/00* | (2018.01) |
| *G06F 11/00* | (2006.01) |
| *H04L 29/06* | (2006.01) |
| *H04W 4/40* | (2018.01) |

(52) U.S. Cl.
CPC . *G08G 1/096725* (2013.01); *G08G 1/096741* (2013.01); *G08G 1/096783* (2013.01); *H04B 1/38* (2013.01); *H04L 63/00* (2013.01); *H04L 67/00* (2013.01); *H04W 4/00* (2013.01); *H04W 4/40* (2018.02); *H04W 84/00* (2013.01); *H04L 67/12* (2013.01)

(58) Field of Classification Search
CPC ......... G08G 1/096741; G08G 1/09675; G05D 1/0055; G06F 11/00; H04W 4/40; H04W 84/00; H04W 4/00; H04B 1/38; H04L 67/12; H04L 67/00; H04L 63/00
USPC ....................................................... 348/148
See application file for complete search history.

(56) References Cited

U.S. PATENT DOCUMENTS

| | | | |
|---|---|---|---|
| 5,877,897 A | 3/1999 | Schofield et al. | |
| 5,977,935 A * | 11/1999 | Yasukawa | G02B 27/017 340/980 |
| 6,690,268 B2 | 2/2004 | Schofield et al. | |
| 7,370,983 B2 | 5/2008 | Dewind et al. | |
| 9,555,736 B2 * | 1/2017 | Solar | B60Q 1/143 |
| 9,558,659 B1 * | 1/2017 | Silver | G08G 1/0125 |
| 9,566,899 B2 * | 2/2017 | Foltin | B60Q 1/085 |
| 9,688,199 B2 * | 6/2017 | Koravadi | B60Q 9/008 |
| 9,729,636 B2 * | 8/2017 | Koravadi | G01C 21/3415 |
| 9,740,945 B2 * | 8/2017 | Divekar | B60R 1/00 |
| 9,789,809 B2 * | 10/2017 | Foltin | B60Q 1/143 |
| 9,881,220 B2 * | 1/2018 | Koravadi | G06K 9/00825 |
| 9,881,501 B2 * | 1/2018 | Weber | G08G 1/09623 |
| 9,921,585 B2 * | 3/2018 | Ichikawa | G01C 21/3658 |
| 10,019,011 B1 * | 7/2018 | Green | B60W 30/0956 |
| 10,081,369 B2 * | 9/2018 | Ando | G01C 21/3655 |
| 10,176,712 B1 * | 1/2019 | Martins | G08G 1/07 |
| 2006/0050018 A1 | 3/2006 | Hutzel et al. | |
| 2009/0174573 A1 | 7/2009 | Smith | |
| 2010/0253594 A1 * | 10/2010 | Szczerba | G01S 13/723 345/7 |
| 2012/0010797 A1 * | 1/2012 | Luo | F02N 11/0837 701/70 |
| 2013/0285840 A1 * | 10/2013 | Allen | G08G 1/07 340/923 |
| 2013/0300583 A1 * | 11/2013 | Wignot | G01S 13/91 340/907 |
| 2014/0067220 A1 * | 3/2014 | Seiler | B60T 7/12 701/70 |
| 2014/0222280 A1 | 8/2014 | Salomonsson et al. | |
| 2014/0334168 A1 * | 11/2014 | Ehlgen | B60Q 1/085 362/466 |
| 2015/0124096 A1 * | 5/2015 | Koravadi | G06K 9/00825 348/148 |
| 2015/0210274 A1 * | 7/2015 | Clarke | B60W 30/00 382/104 |
| 2015/0219463 A1 * | 8/2015 | Kang | G08G 1/143 701/117 |
| 2015/0329107 A1 | 11/2015 | Meyer et al. | |
| 2016/0209844 A1 * | 7/2016 | Lombrozo | B60W 40/00 |
| 2016/0362104 A1 * | 12/2016 | Miller | B60W 30/08 |
| 2017/0212513 A1 * | 7/2017 | Iida | B60W 50/02 |
| 2017/0234976 A1 * | 8/2017 | Grauer | G01S 17/107 356/5.04 |
| 2017/0248949 A1 * | 8/2017 | Moran | B60W 30/085 |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
International Preliminary Report on Patentability in International Application No. PCT/US2017/018055, dated Oct. 11, 2018, pages.
International Search Report and Written Opinion in International Application No. PCT/US2017/018055, dated May 17, 2017, pages.

* cited by examiner

INFRASTRUCTURE-DEVICE STATUS-VERIFICATION SYSTEM FOR AUTOMATED VEHICLES

TECHNICAL FIELD OF INVENTION

This disclosure generally relates to a system for operating an automated vehicle, and more particularly relates to a system configured to verify the status or state of a traffic-control infrastructure-device.

BACKGROUND OF INVENTION

The operation of automated vehicles or autonomous vehicles generally requires reliable information about infrastructure devices such as traffic-control lights, access-gates, and traffic-information signs. Vehicle-to-infrastructure (V2I) communications may be intermittent or may be maliciously altered, hacked, or 'spoofed' so the V2I information received by a host-vehicle is wrong. For example, a hacker may cause V2I information about a traffic-light to indicate that a green-light is being displayed while a red-light is actually being displayed and thereby possibly cause collision of vehicles.

The host-vehicle may be equipped to directly determine information about objects proximate to the vehicle. For example, a camera may be used to determine the color of light being displayed by a traffic-light. However, the field-of-view of the camera may be obstructed by another vehicle such as large truck, or by snow or dirt on the lens of the camera.

SUMMARY OF THE INVENTION

In accordance with one embodiment, an infrastructure-device status-verification system suitable for use by an automated vehicle is provided. The system includes a transceiver, an object-detector, and a controller. The transceiver is suitable to install on a host-vehicle. The transceiver is used to receive an indicated-status of an infrastructure-device proximate to the host-vehicle. The object-detector is suitable to install on the host-vehicle. The object-detector is used to determine a detected-status of the infrastructure-device. The controller is in communication with the transceiver and the object-detector. The controller determines a confirmed-status of the infrastructure-device based on the indicated-status and the detected-status.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
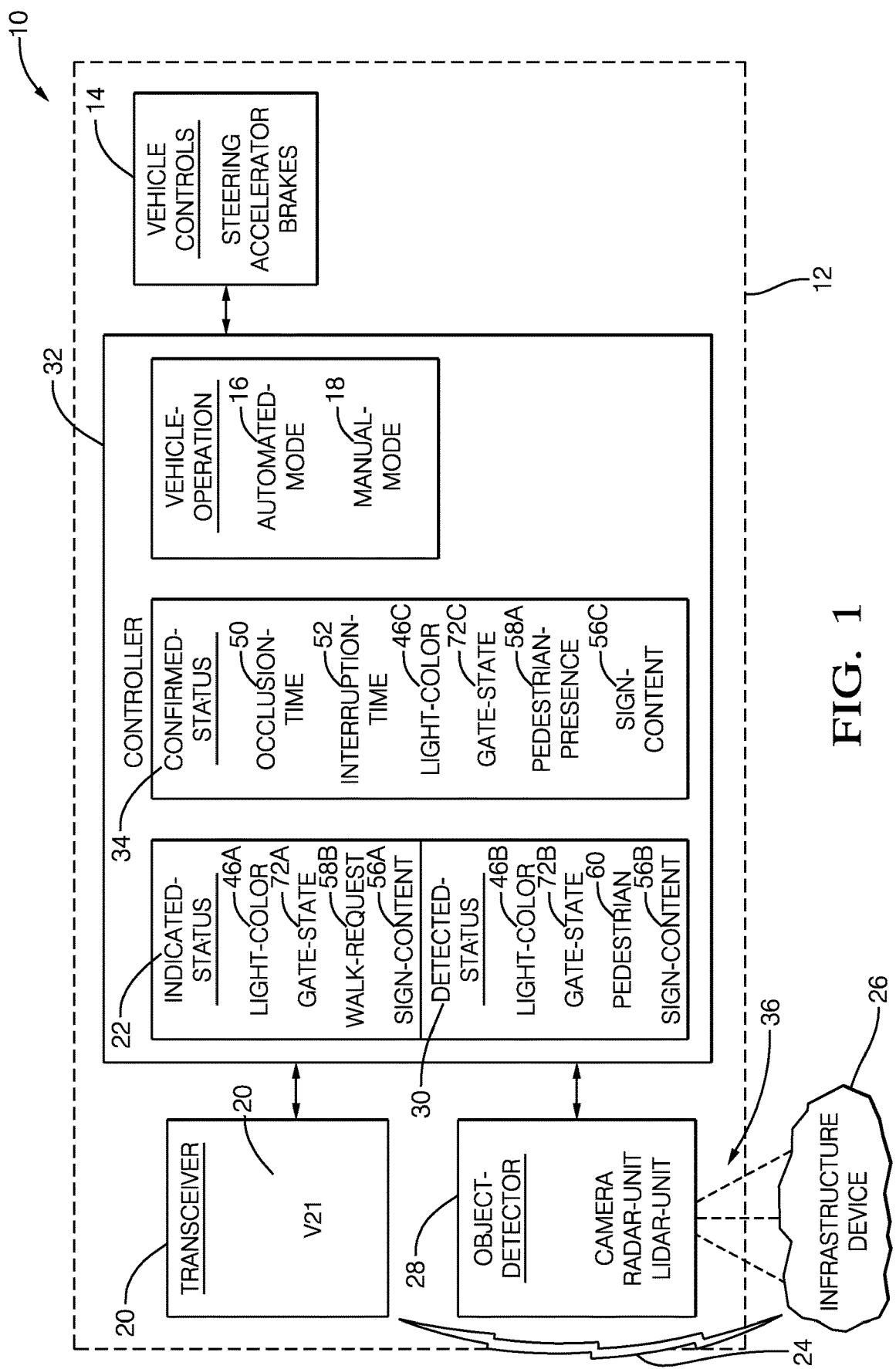
FIG. 1 is a diagram of an infrastructure-device status-verification system in accordance with one embodiment.

FIG. 1 illustrates a non-limiting example of an infrastructure-device status-verification system 10, hereafter the system 10, which is suitable for use by an automated vehicle, hereafter the host-vehicle 12. While the description and examples presented herein are generally directed to fully-automated or autonomous vehicles, it is contemplated that the advantages of the system 10 described herein are applicable to partially automated vehicles where assistance is provided to an operator of the host-vehicle 12 who is generally in control of the vehicle-controls 14 of the host-vehicle 12. That is, the host-vehicle 12 may be operated in an automated-mode 16 (i.e. fully-automated) or a manual-mode 18, or a partial blend of those two modes.

The system 10 includes a transceiver 20 suitable to install on the host-vehicle 12. In general, the transceiver 20 is used to receive an indicated-status 22 via a wireless-transmission 24. The indicated-status 22 is generally indicative of, for example, a status, state, condition, mode of operation, and the like of an infrastructure-device 26. As used herein, the infrastructure-device 26 is any equipment that is involved with regulating or controlling vehicle traffic. Examples of the equipment include, but are not limited to, a traffic-control light at a roadway-intersection, an access-gate to a restricted roadway or parking-lot, and a traffic-information sign proximate to a roadway that indicates, for example, the status of a particular travel-lane (e.g. open or closed) or time to a destination based on present traffic conditions. The indicated-status 22 may be, for example, transmitted from the infrastructure-device 26 using the known radio-frequency vehicle-to-infrastructure (V2I) protocol, a suitably modulated infrared-light on the infrastructure-device, or using other known communication networks such as a Wi-Fi network or cellular network. The transceiver 20 is used to receive the indicated-status 22 of the infrastructure-device 26, which is typically located proximate to the host-vehicle 12.

The system 10 also includes an object-detector 28 suitable to install on the host-vehicle 12. The object-detector 28 is used to determine a detected-status 30 of the infrastructure-device 26. The detected-status 30 is determined based on observations of the infrastructure-device 26 by the object-detector 28, and is generally indicative of the same thing or something that corresponds to the indicated-status 22. The object-detector 28 may include, but is not limited to, a camera, a radar-unit, a lidar-unit, or any combination thereof. By way of example and not limitation, if the indicated-status 22 corresponds to a message displayed on a reconfigurable sign alongside the roadway traveled by the host-vehicle 12, the detected-status may be determined by applying an optical character recognition algorithm to an image captured by a camera of the object-detector 28.

The system 10 also includes a controller 32 in communication with the transceiver 20 and the object-detector 28. The controller 32 may include a processor (not specifically shown) such as a microprocessor or other control circuitry such as analog and/or digital control circuitry including an application specific integrated circuit (ASIC) for processing data as should be evident to those in the art. The controller 32 may include memory (not specifically shown), including non-volatile memory, such as electrically erasable programmable read-only memory (EEPROM) for storing one or more routines, thresholds, and captured data. The one or more routines may be executed by the processor to perform steps for determining a confirmed-status 34 of the infrastructure-device 26 based on the indicated-status 22 and the detected-status 30 which are received by the controller 32 for verifying the actual status of the infrastructure-device 26 as described herein. As will become apparent upon reading of the several non-limiting examples that follow, the confirmed-status 34 is generally established when the indicated-status 22 and the detected-status 30 correspond or indicate the same thing about the infrastructure-device 26. If the indicated-status 22 and the detected-status 30 don't correspond, it may be due to malicious spoofing, the field-of-view 36 between the object-detector 28 and the infrastructure-device 26 being occluded, or interference of the wireless-transmission 24.

Figure 2:
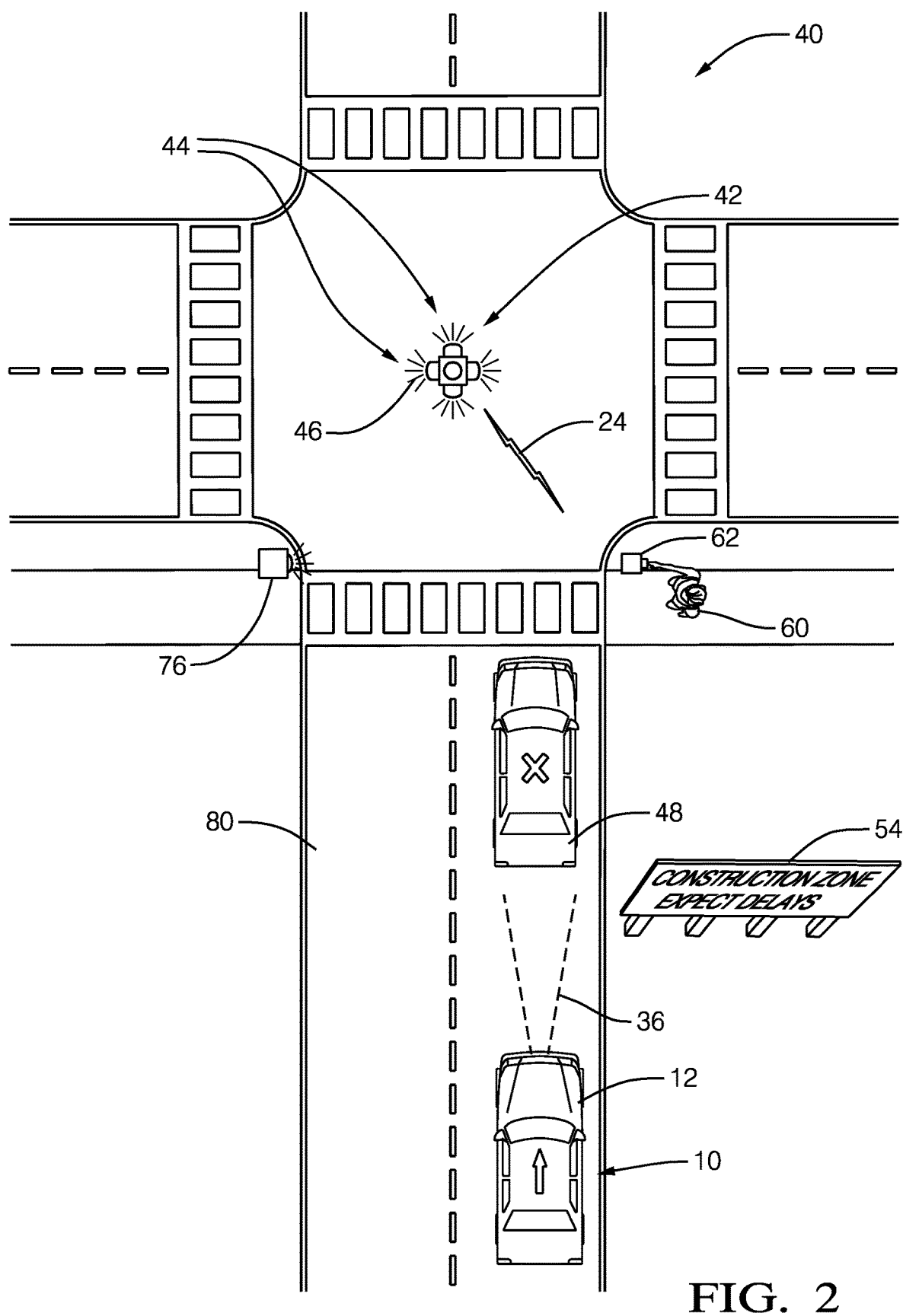
FIG. 2 is a traffic-scenario encountered by the system of FIG. 1 in accordance with one embodiment.

FIG. 2 illustrates a non-limiting example of a traffic-scenario 40 that may be encountered by the host-vehicle 12 or the system 10. In this example, one instance of the infrastructure-device 26 is a traffic-signal 42 operable to selectively emit light 44 characterized by a color 46 (FIG. 1), e.g. red, yellow, green, to control traffic, as will be recognized by those in the art. To detect or determine the light-color 46B as the indicated-status 22, the object-detector 28 preferably is or preferably includes a camera so the detected-status 30 (red, yellow, green) can be determined. The traffic-signal 42 may also be equipped with a V2I transmitter to transmit or broadcast the wireless-transmission 24 so the indicated-status 22 (e.g. the light-color 46A) can be determined by the system 10 in the host-vehicle 12 using the transceiver 20. If the detected-status 30 (e.g. the light-color 46B) and the indicated-status 22 (e.g. the light-color 46A) match, then the confirmed status 34 (e.g. the light-color 46C) may be established and characterized as having a high degree of confidence. If the detected-status 30 and the indicated-status 22 don't match, the light-color 46C that indicates the confirmed-status 34 may be set to red to err on the side of safety, or the confirmed-status 34 may be determined based on other-indicators such as the motion-state (e.g. moving or stopped) of an other-vehicle 48 in front of the host-vehicle 12.

If the confirmed-status 34 is established because the detected-status 30 and the indicated-status 22 match, but as the host-vehicle 12 approaches the other-vehicle 48 the field-of-view 36 becomes occluded by the other-vehicle 48 so the detected-status 30 becomes indeterminate, the system 10, or more specifically the controller 32, may be configured to maintain the confirmed-status 34 based only on the indicated-status 22 for an occlusion-time 50 (e.g. thirty seconds) as long as the indicated-status 22 remains unchanged. Similarly, the controller 32 may be configured to maintain the confirmed-status 34 based only on the detected-status 30 for an interruption-time 52 (e.g. thirty seconds) when reception of wireless-transmission 24 used to determine the indicated-status 22 by the transceiver 20 is interrupted by, for example, electrical noise or other interference including jamming of the wireless transmission with malicious intent.

By way of further example, a reconfigurable-sign 54 proximate to the host-vehicle may broadcast a sign-content 56A from which the indicated-status 22 may be determined, and sign-content 56B may be determined using character-recognition of a camera-image from the object-detector 28. If the detected-status 30 and the indicated-status 22 match, then the sign-content 56C may be established to determine the confirmed-status 34.

By way of further example, a pedestrian-presence 58A may be established to determine the confirmed-status 34 when the object-detector 28 indicates that a pedestrian 60 is present proximate to the host-vehicle 12 thereby determining the detected-status 30, and pressing of a walk-button 62 indicated by a walk-request 58B is received thereby determining the indicated-status 22. V2I communications may also indicate the status of a walk/don't walk sign that may be viewable by the pedestrian 60, but not by the object-detector 28 from the present location of the host-vehicle 12.

Figure 3:
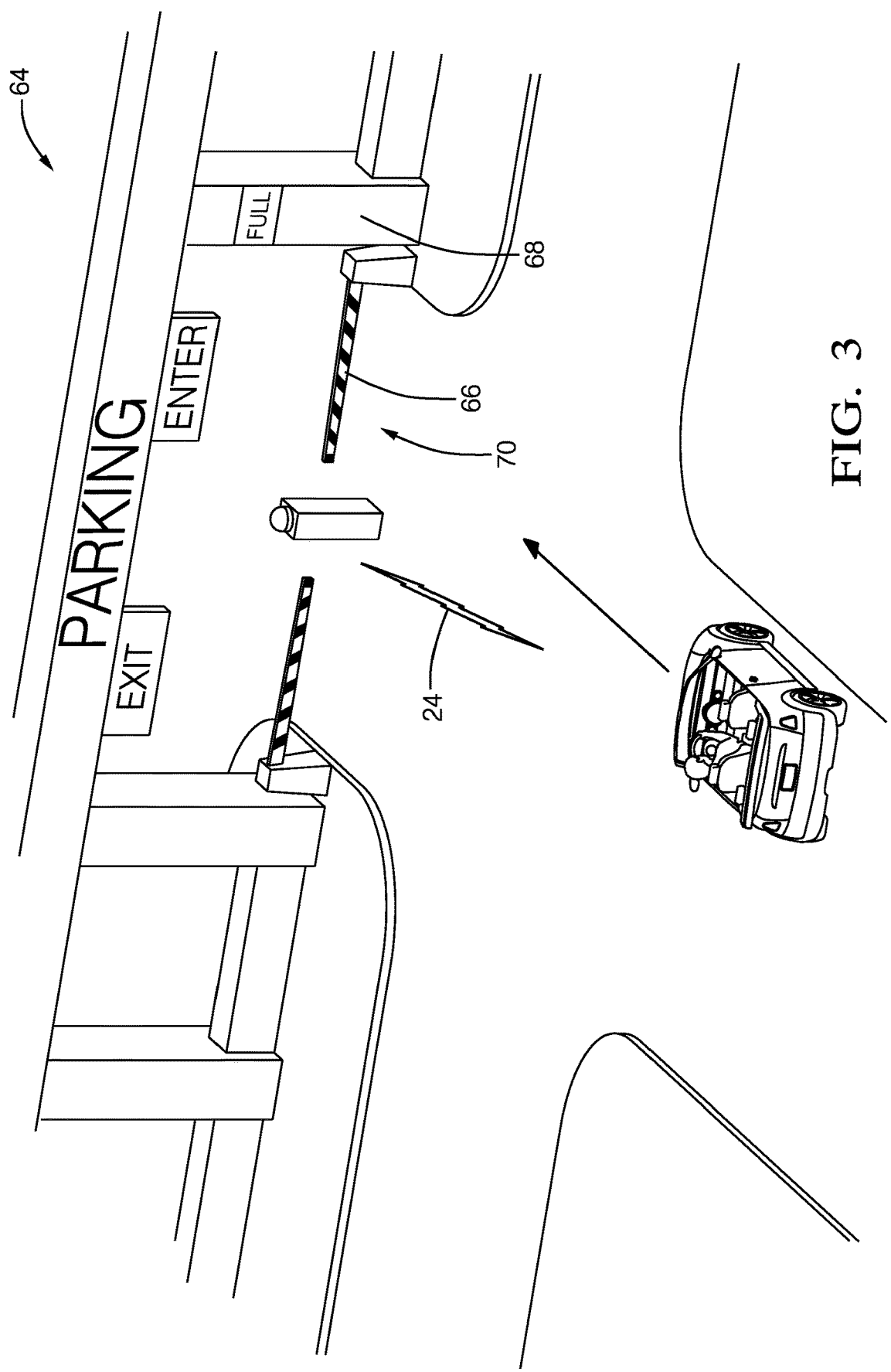
FIG. 3 is a traffic-scenario encountered by the system of FIG. 1 in accordance with one embodiment.

FIG. 3 illustrates a non-limiting example of an other-scenario 64 that may be encountered by the host-vehicle 12 or the system 10. In this example, one instance of the infrastructure-device 26 is a gate 66 that controls access to a parking-garage 68 for parking vehicles. The gate 66 is operable to a state 70 including an open-state (not shown) that allows traffic to pass by the gate 66, and a closed-state (as shown) that prevents traffic from passing by the gate 66. The gate 66 or some part of the parking-garage 68 may be equipped to broadcast the wireless-transmission 24 which would include a gate-state 72A indicating either the open-state or the closed-state, and may also include information about where vacant parking-spots are located within the parking-garage 68. The gate-state 72A is used to determine the indicated-status 22. The object-detector 28 may be or include one or more of a camera, a radar-unit, and a lidar-unit used to detect the gate-state 72B, either the open-state or the closed-state, and the gate-state 72B would be used to determine the detected-status 30. If the detected-status 30 and the indicated-status 22 match, the gate-state 72C is used to determine the confirmed-status 34. For example, if both the detected-status 30 and the indicated-status 22 indicate that the gate is in the open-state, the host-vehicle 12 may proceed into the parking-garage as suggested in FIG. 3.

Accordingly, an infrastructure-device status-verification system (the system 10), a controller 32 for the system 10 and a method of operating the system is provided. The system 10 provides for increased confidence and security regarding information about the status of an infrastructure-device such as the traffic-signal 42 (e.g. red, yellow, and green). By determining the confirmed-status 34 based on the combination of the indicated-status 22 and the detected-status 30, the system 10 can avoid miss-information caused by, for example, hacking or spoofing of V2I communications from the infrastructure-device 26, and overcome instances when the field-of-view 36 between the object-detector 28 and the infrastructure-device 26 becomes occluded after the confirmed-status 34 has been established or determined.

While this invention has been described in terms of the preferred embodiments thereof, it is not intended to be so limited, but rather only to the extent set forth in the claims that follow.

We claim:

1. An infrastructure-device status-verification system, comprising:
  a transceiver installed on a host-vehicle, said transceiver used to receive an indicated-status of an infrastructure-device proximate to the host-vehicle;
  an object-detector installed on the host-vehicle, said object-detector used to determine a detected-status of the infrastructure-device;
  a controller in communication with the transceiver and the object-detector, wherein the controller:
  compares the indicated-status and detected-status;
  determines, based on the comparing, whether the indicated-status and detected-status match;
  in accordance with determining that the indicated-status and the detected-status match;
    establishes a confirmed-status;
    determines whether a change in the indicated-status or the detected-status has occurred;
  in accordance with determining a change in the detected-status due to a field-of-view between the object-detector and infrastructure-device being occluded, maintains the confirmed-status based on the indicated-status for an occlusion-time so long as the indicated-status remains unchanged; and in accordance with determining a change in the indicated-status due to a wireless transmission used to determine the indicated-status being interrupted, maintains the confirmed-status based on the detected-status for an interruption-time so long as the detected-status remaings unchanged, wherein the interruption-time is different than the occlusion-time.

2. The system in accordance with claim 1, wherein the object-detector is a camera, the infrastructure-device is a traffic-signal operable to selectively emit a light characterized by a color, and the detected-status and the indicated-status are indicative of the color emitted by the traffic signal.

3. The system in accordance with claim 1, wherein the infrastructure-device is a gate operable to a state including an open-state that allows traffic to pass by the gate and a closed-state that prevents traffic from passing by the gate, and the detected-status and the indicated-status are indicative of the state of the gate.

4. The system in accordance with claim 1, wherein the innfrastructure-device is a reconfigurable-sign proximate to the host-vehicle and operable to broadcast sign-content from which the indicated-status is determined, and the object-detector is operable to detect the sign-content from which the detected-status is determined.

5. The system in accordance with claim 4, wherein object-detector is a camera and the detected-status is determined using character-recognition of a camera image.

6. The system in accordance with claim 1, wherein the infrastructure-device is a walk/don't walk sign operable to broadcast a signal from which the indicated-status is determined, and the object-detector is operable to detect a pedestrian proximate to the host-vehicle from which the detected-status is determined.

7. The system in accordance with claim 3, wherein the gate controls access to a parking garage.

8. The system in accordance with claim 3, wherein the gate state is broadcast to the host-vehicle in a wireless-transmission, and the wireless-transmission includes information about where vacant parking-spots are located within a parking garage.

9. A method comprising:
receiving, using a transceiver installed on a host-vehicle, an indicated-status of an infrastructure-device proximate to the host-vehicle;
determining, using an object-detector installed on the host-vehicle, a detected-status of the infrastructure-device;
using a controller of the host-vehicle to:
compare the indicated-status and detected-status;
determine, based on the comparing, whether the indicated-status and detected-status match;
in accordance with determining that the indicated-status and the detected-status match,
establish a establish a confirmed-status;
determine whether a change in the indicated-status or the detected-status has occurred;
in accordance with determining a change in the detected-status due to a field-of-view between the object-detector and infrastructure-device being occluded,
maintain the confirmed-status based on the indicated-status for an occlusion-time so long as the indicated-status remains unchanged; and in accordance with determining a change in the indicated-status due to a wireless transmission used to determine the indicated-status being interrupted,
maintain the confirmed-status based on the detected-status for an interruption-time so long as the detected-status remains unchanged, wherein the interruption-time is different than the occlusion-time.

10. The method in accordance with claim 9, wherein the object-detector is a camera, the infrastructure-device is a traffic-signal operable to selectively emit a light characterized by a color, and the detected-status and the indicated-status are indvcative of the color emitted by the traffic signal.

11. The method in accordance with claim 9, wherein the infrastructure-device is a gate operable to a state including an open-state that allows traffic to pass by the gate and a closed-state that prevents traffic from passing by the gate, and the detected-status and indicated-status are indicative of the state of the gate.

12. The method in accordance with claim 9, wherein the infrastructure-device is a walk/don't walk sign operable to broadcast a signal from which the indicated-status is determined, and the object-detector is operable to detect a pedestrian proximate to the host-vehicle from which the detected-status is determined.

13. The method in accordance with claim 9, wherein the infrastructure-device is a reconfigurable-sign proximate to the host-vehicle and operable to broadcast sign-content from which the indicated-status is determined, and the object-detector is operable to detect the sign-content from which the detected-status is determined.

14. The method in accordance with claim 13, whererin object-detector is a camera and the detected-status is determined using character-recognition of a camera image.

15. The method in accordance with claim 11, wherein the gate controls access to a parking garage.

16. The method in accordance with claim 11, wherein the gate state is broadcast to the host-vehicle in a wireless-transmission, and the wireless-transmission includes information about where vacant parking-spots are located within a parking garage.

17. A non-transitory, compter-readable storage medium having instructions stored thereon, that when executed by controller in a host-vehicle, cause the controller to perform operations comprising:
receiving, using a transceiver installed on the host-vehicle, an indicated-status of an infrastructure-device proximate to the host-vehicle;
determining, using an object-detector installed on the host-vehicle, a detected-status of the infrastructure-device;
compare the indicate-status and detected-status;
determine, based on the comparing, whether the indicated-status and detected-status match;
in accordance with determining that the indicated-status and the detected-status match,
establish a confirmed-status;
determine whether a change in the indicated-status or the detected-status has occurred;
in accordance with determining a change in the detected-status due to a field-of-view between the object-detector and infrastructure-device being occluded,
maintain the confirmed-status based on the indicated-status for an occlusion-time so long as the indicated-status remains unchanged; and in accordance with determining a change in the indicated-status due to a wireless transmission used to determine the indicated-status being interruped,
maintain the confirmed-status based on the detected-status for an interruption-time so long as the detected-status remains unchanged, wherein the interruption-time is different than the occlusion-time.

18. The system in accordance with claim 1, wherein the controller is configured to:
determine whether the occlusion-time or the interruption-time has ended; and
in accordance with the occlusion-time or the interruption-time ending, stop maintaining the confirmed status.

19. The method in accordance with claim 9, further comprising:
determine whether the occlusion-time or the interruption-time has ended; and
in accordance with the occlusion-time or the interruption-time ending, stop maintaining the configured status.

20. The non-transitory, computer-readable storage medium of claim 17, wherein the operations further comprise
determining whether the occlusion-time or the interruption-time has ended; and
in accordance with the occlusion-time or the interruption-time ending, stop maintaining the configured status.

\* \* \* \* \*

UNITED STATES PATENT AND TRADEMARK OFFICE
CERTIFICATE OF CORRECTION

PATENT NO. : 10,685,247 B2  Page 1 of 1
APPLICATION NO. : 15/083520
DATED : June 16, 2020
INVENTOR(S) : Gaurav Bhatia, Jong Ho Lee and Jungsung Kim It is certified that error appears in the above-identified patent and that said Letters Patent is hereby corrected as shown below:

In the Claims

Column 4, Line 61, in Claim 1, delete "match;" and insert -- match, --;

Column 5, Line 9, in Claim 1, delete "remaings" and insert -- remains --;

Column 5, Line 24, in Claim 4, delete "innfrastructure-device" and insert -- infrastructure-device --;

Column 5, Line 58, in Claim 9, delete "establish a establish a" and insert -- establish a --;

Column 6, Line 14, in Claim 10, delete "indivcative" and insert -- indicative --;

Column 6, Line 20, in Claim 11, after "and" insert -- the --;

Column 6, Line 34, in Claim 14, delete "whererin" and insert -- wherein --;

Column 6, Line 44, in Claim 17, delete "compter-readable" and insert -- computer-readable --;

Column 6, Line 54, in Claim 17, delete "indicate-status" and insert -- indicated-status --;

Column 7, Line 3, in Claim 17, delete "interruped," and insert -- interrupted, --;

Column 7, Line 20, in Claim 19, delete "configured" and insert -- confirmed --;

Column 7, Line 23, in Claim 20, after "comprise" insert -- : --;

Column 7, Line 27, in Claim 20, delete "configured" and insert -- confirmed --.

Signed and Sealed this
Fourth Day of August, 2020

Andrei Iancu
*Director of the United States Patent and Trademark Office*